Sept. 6, 1960 P. SCHMIDT 2,951,469
VEHICLE DRIVE BY ROTARY VANE-TYPE ENGINES WITH BIG TORQUE
Filed July 20, 1955 6 Sheets-Sheet 3

INVENTOR
PAUL SCHMIDT
BY Young, Emery & Thompson
ATTYS.

Sept. 6, 1960   P. SCHMIDT   2,951,469
VEHICLE DRIVE BY ROTARY VANE-TYPE ENGINES WITH BIG TORQUE
Filed July 20, 1955   6 Sheets-Sheet 4

INVENTOR
PAUL SCHMIDT
By Young, Emery & Thompson
ATTYS.

United States Patent Office 2,951,469
Patented Sept. 6, 1960

2,951,469

VEHICLE DRIVE BY ROTARY VANE-TYPE ENGINES WITH BIG TORQUE

Paul Schmidt, Riesstrasse 18, Munich 54, Germany

Filed July 20, 1955, Ser. No. 523,246

Claims priority, application Germany July 22, 1954

6 Claims. (Cl. 121—56)

For vehicles whose driven wheels shall develop big torques, a drive thereof by a rotary vane-type engine is technically advantageous. But in vehicles the attainment of big torques by means of rotary vane-type engines is rendered difficult in that for accommodating the drive in the most suitable places, especially within a wheel, only a small space is available, so that slight spatial extension of the rotary vane-type engines is required. A further difficulty consists in that, when arranged within a wheel, the rotary vane-type engine is constantly subjected to severe vibration, but nevertheless reliable safety of operation must be achieved.

For attaining any appreciable progress in vehicle engineering, the general advantages offered by an hydraulic drive are per se not sufficient, as appears from the present state of the related art. It rather requires a particularly designed form of the hydraulic drive to make this adaptable with advantage for the structural and operational conditions in vehicles. This purpose is now served by the rotary vane-type engine according to the present invention.

The stipulated requirements are fulfilled by a rotary engine with an annular stroke space of concentric limiting walls of a rotary and a stationary part of the engine, sealing at their transition points, and with at least two stationary vanes connected to one part and dividing said hollow space symmetrically and sealingly, whereby at least double the number of rotary vanes is provided, which are rotatably supported in opposite walls of the hollow space and, governed by guiding elements, are alternately brought into a position symmetrically and sealingly dividing the hollow space and into a position sealingly overrunning the stationary vanes.

Further features of the invention will appear from the claims, the specification and the annexed drawings illustrating by pure way of example two preferred forms of embodiment incorporating the invention.

In said annexed drawings:

Figs. 7 and 8 illustrate a second form of embodiment. Fig. 7 shows this engine in longitudinal section through the wheel axle, in the top part the section A—M, and in the bottom part the section B—M according to Fig. 8. Fig. 8 shows the cross-section in the middle of the engine and one on the line C—M of Fig. 7. The direction of viewing the sections of Figs. 7 and 8 is indicated by short arrows at the characters A, B and C.

Figure 1:
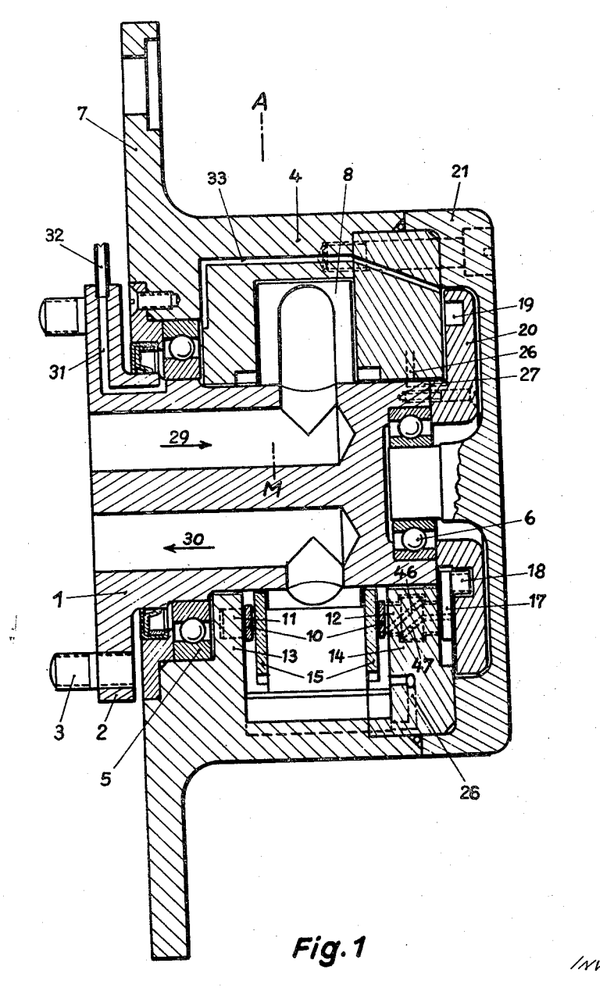
Fig. 1 is a longitudinal section through the engine.

In Fig. 1 the axle of a vehicle wheel which at the same time forms the shaft of the rotary engine, is designated with numeral 1. Mounted on the flange 2 of shaft 1 are screw bolts 3 for fixing the rotary engine to the vehicle. The shaft 1 of the engine has the casing 4 rotatably mounted thereon by means of the ball-bearings 5 and 6. Arranged on said casing is the flange 7 for attaching a wheel felloe.

Figure 2:
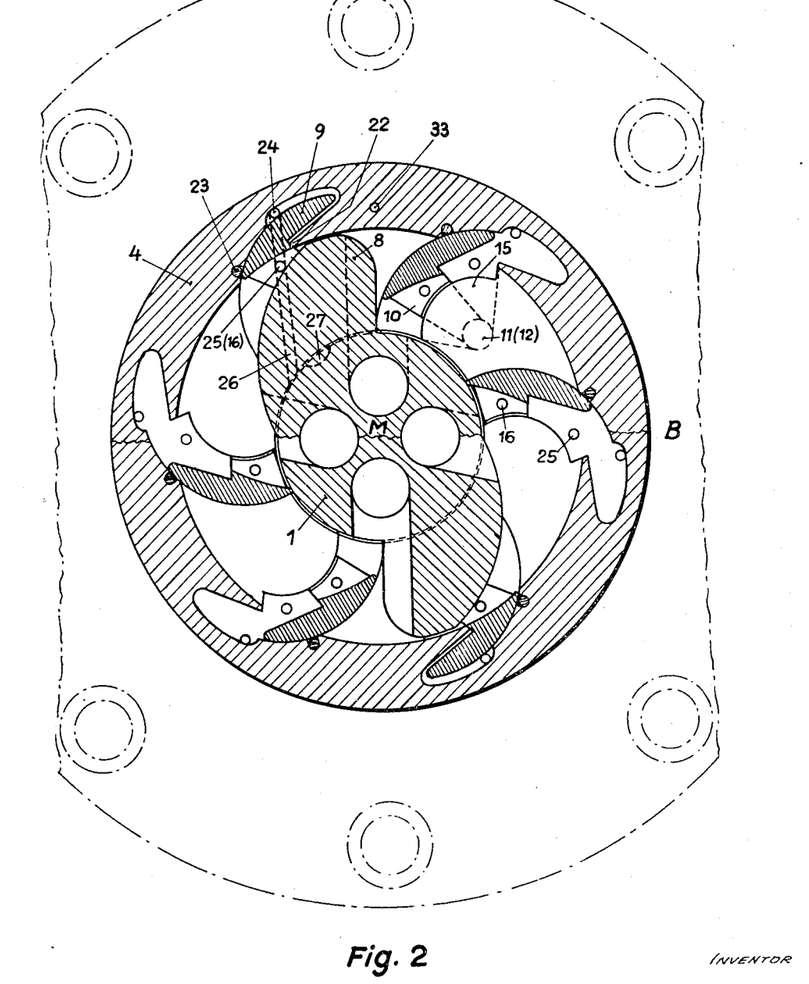
Fig. 2 shows two corresponding sectional views in two different planes.

Fig. 2 shows in its upper half a radial section of Fig. 1 on the line A—M, and in its lower half a section through the median plane of the hollow space (or stroke space) of the engine. The lower half of Fig. 1 represents a cross-section taken on the line M—B of Fig. 2.

In Figs. 1 and 2 two stationary vanes 8 can be seen as connected to the shaft 1. Numeral 9 designates six rocking vanes. The rocking vanes include the rotary vane wall which extends parallel to the shaft of the engine and serves temporarily for dividing the working chamber, the arms 10 together with the pivot studs 11 and 12 supported in opposite walls 13 and 14 of the working chamber. The arms 10 of each rotary vane 9 lie in lateral recesses in the walls of the stroke space. The wall thickness of said arms in the region of their greatest radius fills the recesses in the walls in such a way as to form a sealing gland when a stationary vane is overrun. On their smaller radii, the arms 10 have less thickness of wall, and in this region the arms are covered toward the stroke space by a portion of the side wall designated 15.

It is advantageous to have the rocking vane shaft formed by the pivot studs 11 and 12, arranged parallel to the shaft of the engine. It is also advantageous to execute the ideal, i.e. the median sealing plane of the vane wall as chordal surface of the circular cylinder which is described by the outer sealing edges of the rocking vane wall, running parallel to the axis of rotation. Such an arrangement is an essential means for obtaining slight constructional space of the engine, with at the same time a big torque.

The arms engaging a rocking vane are conveniently located in recesses in the walls of the working chamber. It is also preferable to provide them with thru bores 16 to obtain a relief from unilateral fluid-pressure.

Fig. 1 shows that the pivot studs 11 are supported in bores which are only open toward the working chamber of the engine. Thus pressure equilibrium on the pivot studs 11 will be attained. The pivot studs 12 are led thru the wall 14 of the working chamber into the casing space of the engine, and are at their ends provided with a crank 17. The pivot studs 12 have moreover a ring of larger diameter, which engages an appropriate recess in the wall 14. The two end faces of the ring are of annular corss-section which is equal to that of the pivot stud. The slits at the end faces of the ring communicate thru bores 46 and 47 with the working chamber of the engine, on the one hand, and to the casing space on the other hand. This arrangement provides equilibrium of the pressure forces on the pivot stud 12.

From Figs. 1 and 2 it appears that the median line of the pivot studs 11 and 12 extends within the working chamber of the engine. This is particularly advantageous for obtaining a small structural space of the engine. Further it was found convenient to arrange three times as many rocking vanes as stationary vanes or members, as is shown in Figs. 1 and 2, because in such a way big torques may be obtained within a small structural space, and at the same time favorable conditions for the oscillating movement of the rocking vanes.

Rotation of the vanes 9 in the bearings of their pivot pins 11 and 12 is brought about by the cranks 17 with the crank pin 18. The crankpin 18 engages a guide path 19 arranged in a guide flange 20. Said guide flange 20 is connected to the shaft 1 of the engine, as indicated by a screw shown in broken lines in Fig. 1. It is practical, in accordance with the design as in Fig. 1, to arrange the guiding elements for the operation of the rocking vanes outside the working chamber of the engine.

Figure 3:
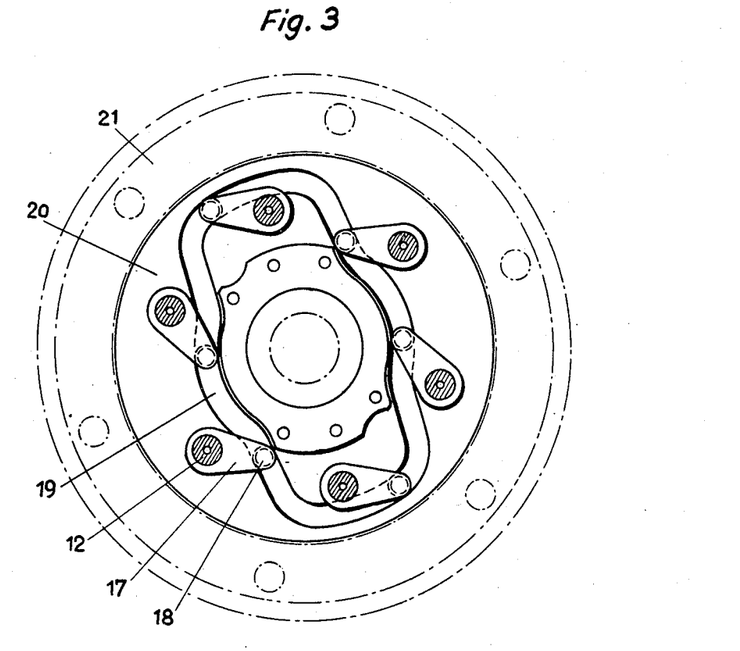
Fig. 3 shows the guiding elements for the rotary vanes when viewing the cover from inside the engine as in Fig. 1.

Fig. 3 represents said guiding flange 20 in more detail. This is a view on the guiding flange 20 seen from inside the engine. The casing cover 21 surrounding said flange 20 is indicated by chain-dotted lines. It is bolted to the casing 4, as shown in Fig. 1. Further, Fig. 3 shows the position of the pivot studs 12 appearing in cross-section, and also the cranks 17 engaging said pivot studs 12. It can be seen what position is given to the cranks 17 by the guide path 19 and the crankpins 18. The arranegment of guiding elements including a crank with crankpin and a guide path for the same, has been found advantageous.

From Figs. 2 and 3 it will be apparent that the size of the angle about which each vane 9 is rotated, is less than 90°. This has been found particularly suitable.

Fig. 2 shows that the wall of each rocking vane 9 when overrunning a stationary valve 8 is led into a pocket of the casing part surrounding the working chamber. At the point of transition from the casing wall to the wall of the vane, the pocket space is sealed toward the working chamber of the engine. This sealing is of essential importance. The sealing results on the one hand by contact of the vane wall with that of the casing at 22, and on the other hand by the sealing roller 23 on the other side of the pocket opening.

When a rotary vane is introduced and when it is withdrawn, the space of a pocket in the casing undergoes a change in its liquid content. In order to facilitate displacement and admission of liquid, equalizing channels with openings 24 and 25 are arranged, whose passage through the wall may be seen as indicated by broken lines in the top part of Fig. 2, and in the bottom part of Fig. 1. The port 25 opening from the wall 14 into the stroke space will be sealingly closed by the lateral limitation of the member when a rotary vane 9 overruns a stationary vane 8.

While a rotary vane 9 overruns a stationary vane 8, the pocket space in the enveloping casing wall gets connected to a space of slight fluid-pressure within the engine. To accomplish this, the channel 26 is led up to the cylindrical bore of the wall 14. The aperture of the channel 26 consequently comes to lie—as indicated by broken lines in Figs. 1 and 2—in the sealing slit between the wall 14 and the shaft 1 of the engine. Said aperture is closed almost over the entire circumference of the engine shaft. Only over a part of the circumference, during which a rotary vane 9 lies in its casing pocket, will the aperture of the channel 26 be connected to the casing space. To this effect the shaft 1 is at its extremity and in the vicinity of the stationary vane or member 8 provided with a groove 27 shown in broken lines in Figs. 1 and 2. It is most suitable to provide a pressure relief of the fluid in a vane pocket of the casing during that position of the vane, in which the rotary vane sealingly overruns a stationary one. The effect of this provision is that the rotary vane will in every case be retained in its position by the fluid-pressure within the stroke space without there being any call on the guide members to interfere with the rotary movement of the vanes.

In one position of the rotary vanes, as the vanes will take up in the vicinity of the horizontal median line in Fig. 2, it is preferable to exert a slight force on the narrow sealing surface of the vane wall sliding on the shaft 1 of the engine.

Figure 4:
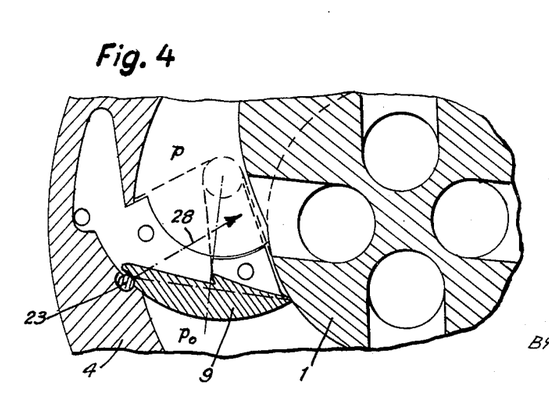
Fig. 4 represents more closely the arrangement of a sealing needle and its effect on the wall of a rotary vane when brought into a position sealingly dividing the hollow space.

In Fig. 4 a corresponding arrangement is shown by way of example. At overpressure of the fluid on one side of the vane wall, the sealing roller 23 exerts a force on the vane in the direction of the arrow 28. For this purpose the cylindrical outer wall of the rocking vane 9 is, at the point where said roller 23 presses on the vane wall, flattened in such a way that the wall runs at right angles to the direction of the arrow 28. By this direction of the force, irrespective of whether the fluid-pressure designated $p$ or $p_0$ is greater on one side of the vane or the other, a momentum will in every case be exerted on the vane wall, which provides the required force on the sealing gland on the engine shaft 1.

The arrangement as shown in Figs. 1 and 2 involves appreciable merits. These result mainly from the rule of forming an annular stroke space of a rotary engine by an outer cylinder wall and two radially running side walls on the one hand, as well as by an inner cylinder wall on the other hand. In such arrangement a particularly small structural space and a big torque may be obtained with simple means, and the extent of the sealing glands that are always required becomes at the same time favorable. As a result, unavoidable losses are reduced and a favorable efficiency is attained.

Admission and discharge of the fluid is preferably effected radially and on both sides of the stationary vanes. Figs. 1 and 2 illustrate such a method of guiding the fluid. Admission of the fluid is indicated by the arrow 29, and discharge by the arrow 30. In Fig. 2 the channel to arrow 29 lies in the top part of the engine shaft, and the channel to arrow 30 is at right-hand from the centre of the engine.

It is advantageous always to maintain in the casing space of the rotary engine a pressure which is of the magnitude of the atmospheric pressure. The engine shaft may then be designed as stub shaft without there being any axial thrust exerted on the casing by fluid-pressure. To accomplish this, in the rotary engine according to Fig. 1, a channel 31 is arranged which leads from the casing space thru flange 2 and a subsequent conduit 32 to a tank wherein the pressure is approximately atmospheric. It is preferable to keep the tank pressure slightly higher than atmospheric to prevent entry of air into the circuit of the fluid without adopting further means. Fig. 1 represents further a channel 33. It connects the left and right sides of the casing space to ensure that the fluid-pressure on both sides of the casing space is always the same.

When driving a vehicle, there will be at times a working condition in which one of the driven vehicle wheels encounters no sufficient ground resistance. This results also in operational conditions in which a big torque of each wheel is necessary, whereby accordingly a high fluid-pressure exists. If then the ground resistance is more or less non-existent, the vehicle wheels relieved from resistance would immediately acquire a high speed. At a high speed the rotary engine would bring about an inadmissibly accelerated displacement of the rotary vanes and would thus be in danger. To prevent this, it is well to provide the piping of the fluid circuit of a rotary engine with a throttling device adapted to throttle automatically the flow of liquid on exceeding the maximum value of the liquid quantity.

Figure 5:
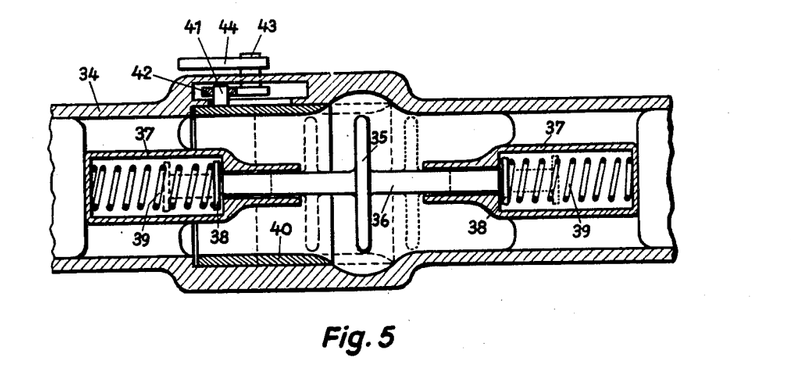
Figs. 5 and 6 show a form of embodiment which effects an automatic throttling of the flow of liquid when a wheel finds no sufficient ground resistance and the rotary engine would attain inadmissible high speeds if the flow of liquid was not throttled.
Figure 6:
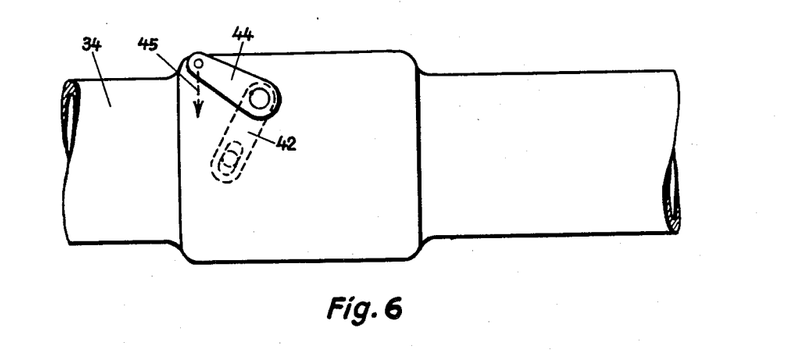

Figs. 5 and 6 represent such a device by way of example. Fig. 5 shows a longitudinal section, and Fig. 6 shows the device as viewed from the top side of Fig. 5. Numeral 34 designates a part of the conduit of the liquid current for a vehicle wheel. Arranged within conduit 34 there is a damming disk 35 supported on both sides by a shaft 36. The bearing thereof is located within the covers of the cylinders 37, and each extremity of the shaft 36 carries a disk 38. Said disks 38 are baissed by coil springs 39 to such an extent that, with normal operation of the vehicle, no change will occur in the position of the damming disk 35. If, however, the admissible speed of flow of the liquid is exceeded, the damming disk 35 moves in the direction of flow of the liquid and brings about a throttling of the liquid flow, owing to the occurring restriction of the cross-section of flow, as will be clear from Fig. 5. By properly choosing the size of said disks 38, the action can be readily regulated with the desired damping of the movements.

Figs. 5 and 6 show moreover the way in which also an arbitrary throttling or stopping of the liquid flow can be effected. The operation of a vehicle may require this in some cases. In Fig. 5 the axially displaceable sleeve 40 is shown in a position in which the liquid flow passes freely. Mounted on said sleeve 40 is a pin 41 engaged by a lever 42 indicated in broken lines in Fig. 6. Said lever 42 is connected via shaft 43 to the lever 44. Operation of the lever 44, in the direction of the arrow 45 in Fig. 6, will cause sleeve 40 to move to the right to constrict the liquid flow within the apparatus and, if necessary, to stop it altogether.

In a further form of the invention, a rotary engine is advantageous with an annular stroke space into which supply and discharge conduit lines open and which is formed by concentric walls of a rotary and a stationary part of the engine, sealing at their points of transition. Thereby at least two fixed vanes dividing the stroke space symmetrically and sealingly have to be arranged on one part, with at least double the number of rotary vanes on the other part. The rocking vanes are thereby designed substantially as circular sectors with cut-outs for sealingly overrunning the stationary vanes and entering corresponding circular grooves in opposite walls of the stroke space. Governed by guiding members, they are alternately brought into a position sealingly dividing the stroke space, being thereby loaded by the pressure of the driving fluid and kept in the position of rest with respect to their supporting surfaces, and then, after their relief by another rocking vane, brought into a position of rest sealingly overrunning another stationary vane, by turning in the circular grooves. After overrunning a stationary vane, they are turned again into the initial position and thus reloaded.

As a consequence of involved possible transmission of great forces within a small structural space, without sliding friction of the structural elements loaded by the pressure of the driving fluid, technically favorable conditions will result for the installation, the weight required, the efficiency and the working conditions in vehicles.

Figure 7:
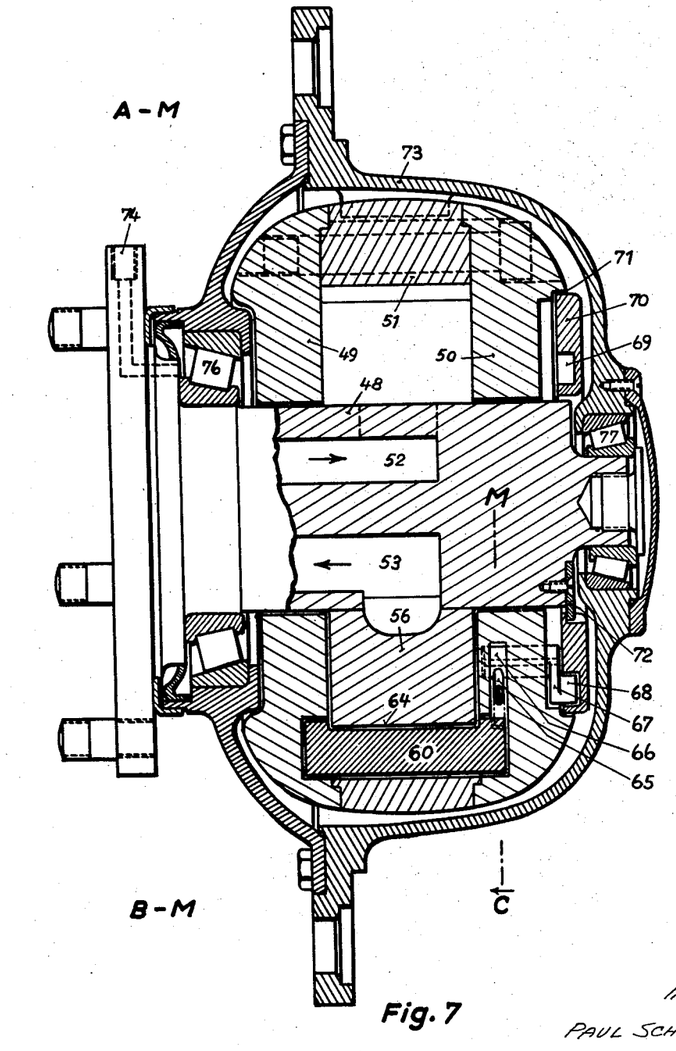
Figure 8:
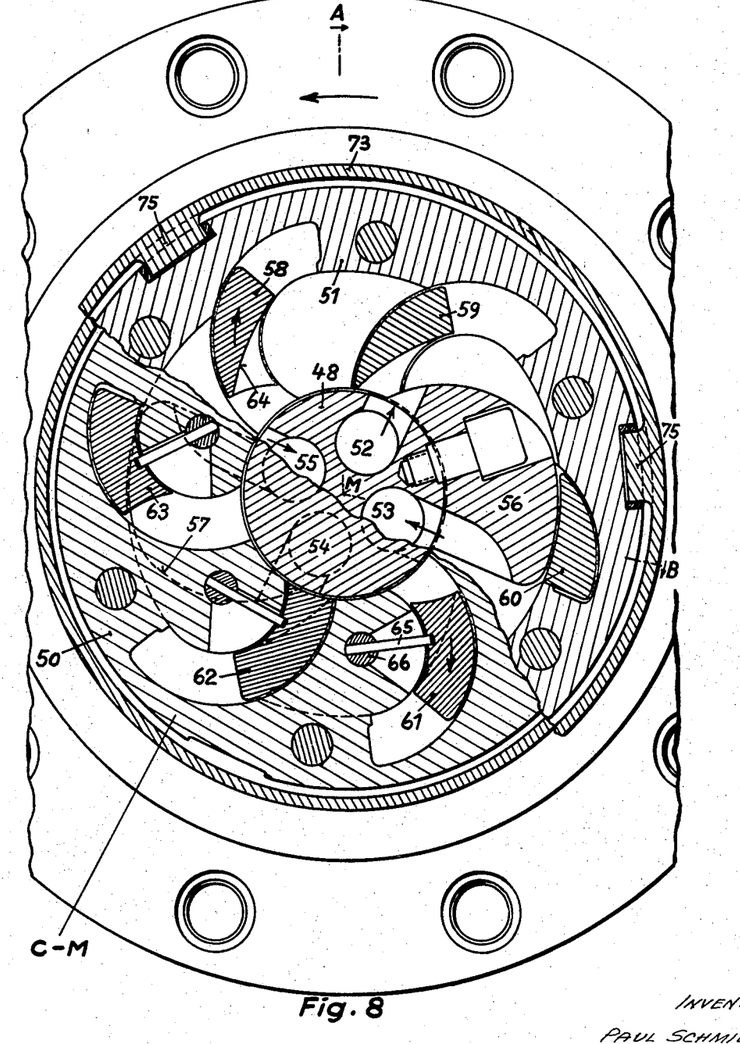

The annular working chamber of the engine is constituted in Figs. 7 and 8 by the shaft 48 on the one hand, and on the other hand by the opposite walls 49 and 50 together with the casing ring 51. Conduit lines 52, 53, 54, 55 lead into the working chamber, whereof each two opposite ones respectively serve for admitting and discharging the driving fluid as indicated by arrows in the figures. Between the rotary part formed by the elements 49, 50 and 51 and the axle 48 there are sealing clearances.

The two stationary vanes 56, 57 project into the stroke space of the engine and are joined to the axle 48, while forming sealing clearances. The stationary vane 57 is shown in broken lines in Fig. 8. The stationary vanes 56 and 57 provide a symmetrical dividing of the stroke space. Further, rotary vanes 58–63 are arranged substantially in the form of a circular ring sector provided with cut-outs for sealingly overrunning the stationary vanes 56 and 57. The form of the circular ring sector appears in section C—M of Fig. 8, the position of which is indicated in Fig. 7. The section C—M in Fig. 8 represents a part of the vanes, projecting into the circular grooves of the wall 50. To enable overrunning the stationary vanes, the circular ring sectors are recessed internally on the lines 64. Due to the cut-out along the line 64, the rotary vanes are consequently not to be considered as accurately circular ring sectors in the mathematical sense, though this basic form is essential for them.

As visible in Figs. 7 and 8, the position of the rocking vanes 58–63 is controlled by guiding elements. The guiding elements, which are moved by the relative motion of the rotary part with respect to the stationary part of the engine, include a pivoted arm 65 engaging a small recess in a rotary vane, a crankshaft 66, a crank 67 and a crankpin 68.

Said crankpin 68 engages a guideway 69 disposed in a guide disk 70. This guide disk 70 is at its outer edge at 71 held concentrically and slidingly by the casing wall 50, and prevented from angular and axial displacement by holding plates 72.

The action of the guiding elements is to bring the vanes on the one hand into a position sealingly dividing the working chamber as is shown in Fig. 8 by the vanes 59 and 62 loaded by the pressure of the driving fluid. In this position the vanes will remain until relieved by a similar position of the following vane. On being loaded, the vanes abut at their ends on the supporting surfaces of the circular grooves of the casing walls 49 and 50. On the other hand, having been unloaded, the vanes are brought into a position by the guiding elements as is shown in Fig. 8 by the vanes 60 and 63. The movement of the vanes may be assisted by fluid-equalizing channels to the spaces in part 51 which are entered by the vanes. In the position taken by the vanes 60 and 63, they sealingly overrun the stationary vanes 56 and 57. After overrunning the stationary vanes 56 and 57, the rocking vanes are restored to their former position by the guiding elements, whereby they sealingly divide the stroke space and become reloaded.

It is advantageous to effect a stepped change of a rest position of the rotary vanes by rotating them through less than 120°, preferably less than 90°.

In order to keep the structural space small, it is preferable to have the ideal part of the axis of the rocking vanes and grooves disposed in such a way as to extend within the stroke space, conveniently in the region of the mean height thereof. Such an arrangement is shown in Figs. 7 and 8.

The disclosed construction has the advantage that the annular grooves of opposite walls of the stroke space may be adapted to support the rocking vanes on being loaded.

The great power effects caused by the pressure of the driving fluid entail an elastic deformation of the structural elements of the engine. To meet technically the geometrical changes thereby involved, it is preferable to bring about the turning of the rocking vane by a guiding element which, in accordance with the construction shown, has no fixed connection with a rocking vane, and only transmits forces to the vane in the direction in which it turns. Thus, it is possible to avoid undesirable stresses between the rocking vane and the controlling elements.

Due to great hydraulic power acting on the rotary vane, the supporting surfaces for the vanes when being loaded will be tightly pressed on each other. As the rocking vanes upon relief shall be moved with respect to the supporting surfaces, a close contact of the latter is undesirable for the movement, because it might easily lead to seizing. In order to avoid any seizing of the contact surfaces upon disappearance of the pressure load of a rocking vane, it is advantageous to have at least one of the contact surfaces designed curved with respect to the other so that it will rest in ball-pressure-like fashion against the other when the rotary vane is being loaded.

In view of the pressure forces as high as several thousands of kilograms occurring in practical operation, and because of the extension coming into question for the supporting surfaces, with ball-pressure-like supporting elastic deformations of the surfaces will result according to the equations of Hertz, which deformations upon relief of pressure will lead to a raising of the supporting surfaces of the order hundredths of a millimeter. Thereby a corresponding laminar fluid layer will form between the supporting surfaces. Already with the presence of a laminar film less than one hundredth of a millimeter thick, under the prevailing conditions no essential forces will occur as directed contrary to a sliding movement. Under formation of the laminar film, any close contact of the supporting surfaces will theoretically contract to a point, provided there was previous pure ball-pressure contact. A point-contact, however, forms no resistance in the case of relative movement on an unloaded sliding surface. Hence it appears, that an elastic deformation by ball-pressure-like supporting, with the action of the pressure of the driving fluid, sets a rocking vane rotating without exertion of great forces when the pressure of the driving fluid has disappeared.

In actual practice it is not in all cases necessary to provide an exact ball-pressure contact, even if this is the most favorable. In some cases also a contact will suffice which is partly based on roller pressure and upon relief it will to a certain extent theoretically result in a line contact. Thus in many cases, a contact of the ball-pressure type is to be preferred.

To secure safe guidance of the rocking vanes in their sliding paths it is suggested to provide two or more curved surface parts on a supporting surface.

When driving vehicles by rotary engines, it should be considered that as a rule the temperature of the driving fluid considerably differs from the temperature of the atmosphere. After some working time, the unavoidable losses of the energy transmission will result in an increase in the temperature of the driving fluid so that within the engine the temperature is higher than outside the engine walls. Because of this, an unsymmetrical deformation of the structural elements of the engine will positively ensue. This, however, is undesirable, inasmuch as the guides for the rocking vanes, the supporting surfaces and the control elements will thereby undergo changes in their proper position with respect to each other.

To avoid an unfavorable change in the position of the structural elements because of great temperature differences within the walls of the engine, it is preferable to have the wall of the working chamber insulated externally to prevent heat transmission.

Then it is suggested to surround the walls of the stroke space with a special enveloping member or jacket, preferably so as to catch the driving fluid issuing at the sealing clearance of the engine. This jacket is designated 73 in Figs. 7 and 8. The driving fluid issuing through the sealing clearance into the jacket, may be drained therefrom and led to a collector. The bore 74 in the fixing flange of axle 48, shown in Fig. 7, serves for this.

To support the circumferential force of the hollow body, preferably, some symmetrically distributed supporting places should be provided as shown in Fig. 8 at 75. Thereby it is of advantage to arrange between the supporting structural element of the hollow body and that of the jacket a somewhat elastically resilient substance, such as a rubber-like material so as to ensure practically an equally great supporting force at each supporting place.

Furthermore, the jacket surrounding the walls of the stroke face is conveniently provided with the bearing places necessary for supporting the vehicle against the axle, as shown in Fig. 7 and designated 76 and 77 so that body of the stroke face will be relieved from these wheel forces, and only supports its circumferential force against the jacket.

Though only two embodiments of the present invention have been described, it is readily apparent to those skilled in the art that other modifications can be made without departing from the spirit of the invention as set forth in the appended claims. The application of the rotary vane-type engine according to the invention is not restricted to vehicles as it may also be found suitable in technical fields having similar operational or structural conditions. In some applications of the rotary vane-type engine the casing may also be appropriately designed stationary and the other engine part rotatable.

What I claim is:

1. A rocking vane type engine for a vehicle drive comprising a rotary part including a wheel-supporting member and an annular working chamber, a stationary part, delivery and discharge ducts in the working chamber for the driving fluid, the working chamber being defined by two side walls and two concentric walls so that a sealing clearance is provided between the rotary part and the stationary part, at least two members secured to one of the parts and projecting into and symmetrically and sealingly dividing the working chamber, and a plurality of rocking vanes connected to the other part movable by controlling members into positions dividing the working chamber and overrunning the members, the rocking vanes in the position for dividing the working chamber being supported against the pressure of the driving fluid by supporting surfaces of the two side walls and one of the concentric walls and being in rest relative to the supporting surfaces while under the pressure of the driving fluid.

2. A rocking vane type engine according to claim 1, wherein the side walls are provided with grooves and the rocking vanes engage the grooves, and the supporting surfaces of the side walls being constituted by the sides of said grooves.

3. A rocking vane type engine for a vehicle drive comprising a rotary part including a wheel-supporting member and an annular working chamber, a stationary part, delivery and discharge ducts in the working chamber for the driving fluid, the working chamber being defined by two side walls and two concentric walls so that a sealing clearance is provided between the rotary part and the stationary part, at least two members secured to one of the parts and projecting into and symmetrically and sealingly dividing the working chamber, and a plurality of rocking vanes connected to the other part movable by controlling members into positions dividing the working chamber and overrunning the members, the rocking vanes in the position for dividing the working chamber being supported by the two side walls and one of the concentric walls, each rocking vane being pivoted by an arm which engages in a recess in the rocking vane.

4. A rocking vane type engine for a vehicle drive comprising a rotary part including a wheel-supporting member and an annular working chamber, a stationary part, delivery and discharge ducts in the working chamber for the driving fluid, the working chamber being defined by two side walls and two concentric walls so that a sealing clearance is provided between the rotary part and the stationary part, at least two members secured to one of the parts and projecting into and symmetrically and sealingly dividing the working chamber, and a plurality of rocking vanes connected to the other part movable by controlling members into positions dividing the working chamber and overrunning the members, the rocking vanes in the position for dividing the working chamber being supported by the two side walls and one of the concentric walls, at least one of the bearing surfaces which bear on one another when a vane is loaded, being curved with respect to the other so as to bear elastically thereon by ball pressure.

5. A rocking vane type engine for a vehicle drive comprising a rotary part including a wheel-supporting member and an annular working chamber, a stationary part, delivery and discharge ducts in the working chamber for the driving fluid, the working chamber being defined by two side walls and two concentric walls so that a sealing clearance is provided between the rotary part and the stationary part, at least two members secured to one of the parts and projecting into and symmetrically and sealingly dividing the working chamber, and a plurality of rocking vanes connected to the other part movable by controlling members into positions dividing the working chamber and overrunning the members, the rocking vanes in the position for dividing the working chamber being supported by the two side walls and one of the concentric walls, the walls of the working chamber being externally insulated against heat transmission and enclosed in a jacket which collects driving fluid escaping through the sealing clearances of the engine.

6. A rocking vane type engine for a vehicle drive comprising a rotary part including a wheel-supporting member and an annular working chamber, a stationary part, delivery and discharge ducts in the working chamber for the driving fluid, the working chamber being defined by two side walls and two concentric walls so that a sealing clearance is provided between the rotary part and the stationary part, at least two members secured to one of the parts and projecting into and symmetrically and sealingly dividing the working chamber, and a plurality of rocking vanes connected to the other part movable by controlling members into positions dividing the working chamber and overrunning the members, the rocking vanes in the position for dividing the working chamber being supported by the two side walls and one of the concentric walls, the walls of the working chamber being externally insulated against heat transmission and enclosed in a jacket which collects driving fluid escaping through the sealing clearances of the engine, and the peripheral force on the walls of the working chamber being transmitted to the jacket at symmetrically spaced support points by means of elastic intermediate layers.

References Cited in the file of this patent

UNITED STATES PATENTS

| | | |
|---|---|---|
| 274,669 | Starks | Mar. 27, 1883 |
| 501,146 | Hunt | July 11, 1893 |
| 607,922 | Evans et al. | July 26, 1898 |
| 659,790 | Cruyt | Oct. 16, 1900 |
| 666,013 | Jackson | Jan. 15, 1901 |
| 674,298 | Lamson | May 14, 1901 |
| 781,342 | Hoffman | Jan. 31, 1905 |
| 967,396 | Lecaime | Aug. 16, 1910 |
| 1,115,397 | Clawson | Oct. 27, 1914 |
| 2,110,554 | Metzler | Mar. 8, 1938 |
| 2,391,360 | Stephens | Dec. 18, 1945 |
| 2,398,313 | Jensen | Apr. 9, 1946 |
| 2,507,357 | Stoner | May 9, 1950 |
| 2,738,849 | Nubling | Mar. 20, 1956 |